United States Patent
Dominguez Pastor et al.

(10) Patent No.: US 12,194,685 B2
(45) Date of Patent: Jan. 14, 2025

(54) PRINT OPERATION USING PLURAL SETS OF PROCESS VALUES

(71) Applicant: HEWLETT-PACKARD DEVELOPMENT COMPANY, L.P., Spring, TX (US)

(72) Inventors: Pablo Dominguez Pastor, Sant Cugat del Valles (ES); Daniel Pablo Rosenblatt, Sant Cugat del Valles (ES); Alejandro Manuel De Pena Hempel, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 345 days.

(21) Appl. No.: 17/634,493

(22) PCT Filed: Oct. 30, 2019

(86) PCT No.: PCT/US2019/058772
§ 371 (c)(1),
(2) Date: Feb. 10, 2022

(87) PCT Pub. No.: WO2021/086346
PCT Pub. Date: May 6, 2021

(65) Prior Publication Data
US 2022/0288861 A1    Sep. 15, 2022

(51) Int. Cl.
*B29C 64/393*    (2017.01)
*B29C 64/171*    (2017.01)
(Continued)

(52) U.S. Cl.
CPC .......... *B29C 64/393* (2017.08); *B29C 64/171* (2017.08); *B33Y 50/02* (2014.12); *B33Y 30/00* (2014.12)

(58) Field of Classification Search
CPC ..... B29C 64/171; B29C 64/393; B33Y 50/02; B22F 10/85
See application file for complete search history.

(56) References Cited

U.S. PATENT DOCUMENTS

| 6,066,285 A | 5/2000 | Kumar |
| 8,119,053 B1 | 2/2012 | Bedal et al. |

(Continued)

FOREIGN PATENT DOCUMENTS

| DE | 102018201901 A1 | 8/2019 | |
| WO | WO-2016175813 A1 * | 11/2016 | ............. B22F 10/40 |

(Continued)

OTHER PUBLICATIONS

Matt Stultz, 4-Headed Printer Makes Multiple Parts Simultaneously, Feb. 25, 2015, Makezine.

*Primary Examiner* — Vincent H Tran
(74) *Attorney, Agent, or Firm* — Michael Dryja

(57) ABSTRACT

Example implementations relate to process capability procedures for additive manufacturing machines. One example implementation receives and prints two objects with corresponding process values for a set of process parameters within two build regions of the build volume. Measurements are made of each object comprising print parameters and a dataset comprising data representing the process values associated with the print parameters and data representing the second process values associated with the second print parameters is generated.

14 Claims, 2 Drawing Sheets

(51) Int. Cl.
*B33Y 50/02* (2015.01)
*B33Y 30/00* (2015.01)

(56) References Cited

U.S. PATENT DOCUMENTS

| | | | |
|---|---|---|---|
| 2015/0045924 A1* | 2/2015 | Cluckers | B29C 64/393 |
| | | | 700/98 |
| 2015/0116201 A1 | 4/2015 | Tsou et al. | |
| 2015/0331402 A1* | 11/2015 | Lin | G05B 15/02 |
| | | | 700/119 |
| 2017/0050386 A1 | 2/2017 | Houben et al. | |
| 2017/0197366 A1 | 7/2017 | Abbott, Jr. | |
| 2018/0067464 A1* | 3/2018 | Budge | B29C 64/393 |
| 2018/0099460 A1* | 4/2018 | Iverson | B33Y 50/02 |
| 2018/0133975 A1* | 5/2018 | Zhao | B29C 64/295 |
| 2018/0319087 A1* | 11/2018 | Eom | B29C 64/106 |

FOREIGN PATENT DOCUMENTS

| | | | |
|---|---|---|---|
| WO | WO-2017108108 A1 * | 6/2017 | B29C 64/357 |
| WO | WO-2018/140033 A1 | 8/2018 | |
| WO | WO2019/055576 A1 | 3/2019 | |
| WO | WO-2019070250 A1 | 4/2019 | |
| WO | WO-2019/150116 A1 | 8/2019 | |

* cited by examiner

PRINT OPERATION USING PLURAL SETS OF PROCESS VALUES

BACKGROUND

Apparatus that generate three-dimensional objects, including those commonly referred to as "3D printers", receive definitions of the three-dimensional objects in the form of object models. Each object model is processed to instruct the apparatus to produce the object using a particulate material. This may be performed on a layer-by-layer basis.

BRIEF DESCRIPTION OF THE DRAWINGS

Various features of the present disclosure will be apparent from the detailed description which follows, taken in conjunction with the accompanying drawings, wherein.

DETAILED DESCRIPTION

Figure 1:
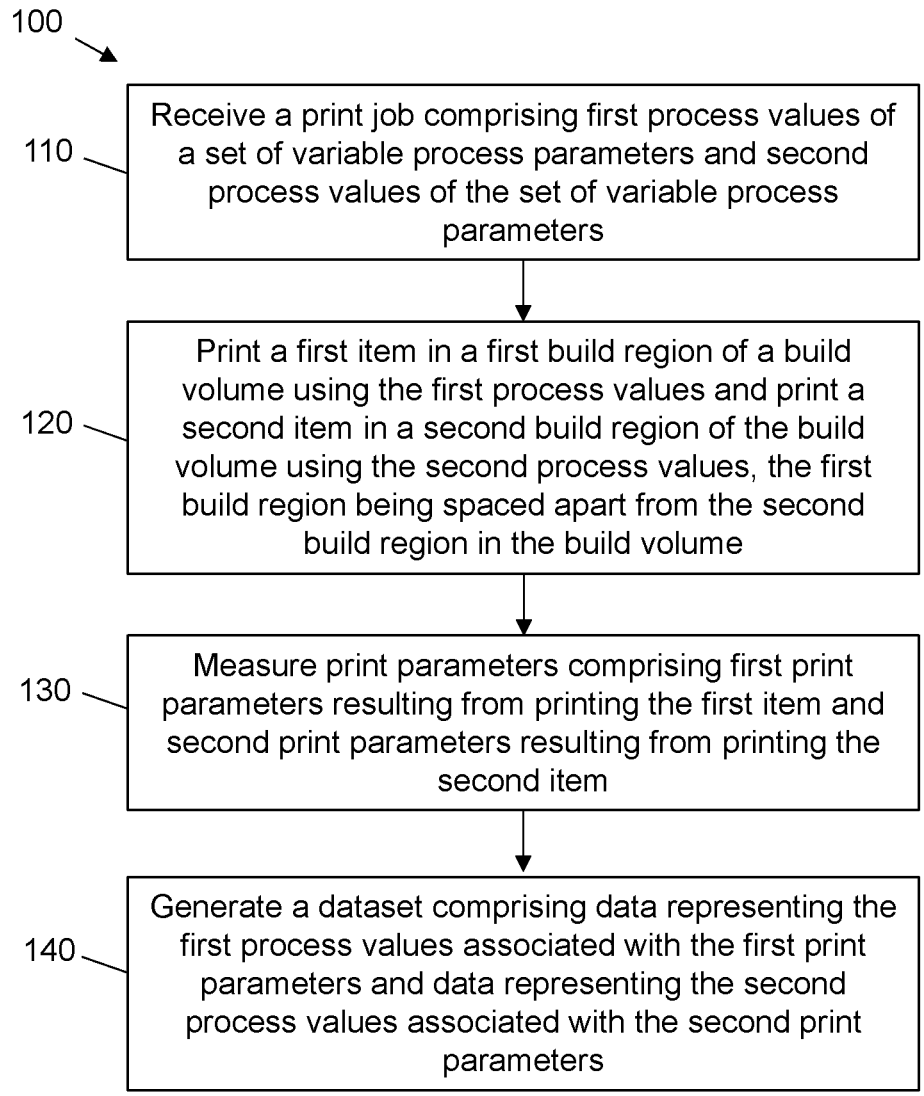
FIG. 1 is a flow chart illustrating a method of performing process capability analysis of a 3D printer according to an example.

In industrial manufacturing, process capability studies may be used to gain knowledge about the behavior of production equipment carrying out a particular process, determine measurable attributes and create refinements from this information. For example, it is useful to find out whether a selected manufacturing process is able to provide product characteristics that do not exceed tolerance limits.

It is becoming more common for industrial manufacturing to utilize additive manufacturing machines, such as 3D printers, to manufacture products on a large scale. Capability studies may involve conducting a large number of tests, applying a significant range of parameter variations in different combinations, to generate sample results populations, based on which processes may be adjusted and tuned to be suitable for any particular production task. Extensive tests of this kind may need to be performed by a manufacturer when it introduces a new 3D printer, and/or when a manufacturer wishes to build a new kind of product with a new or an existing 3D printer. Certain examples described herein relate to generating process capability data for additive manufacturing machines such as 3D printers.

In 3D printing, three-dimensional objects may be generated by solidifying portions of successive layers of build material within an available build volume of a build unit of a 3D printer. In some examples, the build volume is above a build platform of the build unit and has an x-axis and a y-axis. The build platform lowers in a z-axis of the build volume as successive layers of build material are deposited on the build platform. The build material can be, for example, powder-based, and the material properties of the generated objects may be dependent on the type of build material used and the nature of the solidification process. In some examples, the solidification of the powder material is enabled using a liquid fusing agent. In other examples, solidification may be enabled by the temporary application of energy to the build material. In certain examples, fusing agents are applied to the build material, wherein a fusing agent is a material that, when a suitable amount of energy is applied to a combination of build material and fusing agent, causes the build material to melt, fuse, sinter, coalesce or otherwise solidify. In other examples, other build materials and other methods of solidification may be used, such as a chemical binder system using a chemical binding agent. In certain examples, the build material may be in the form of a paste or a slurry.

Examples of build materials for additive manufacturing include polymers, crystalline plastics, semi-crystalline plastics, polyethylene (PE), polylactic acid (PLA), acrylonitrile butadiene styrene (ABS), amorphous plastics, polyvinyl alcohol plastic (PVA), polyamide (e.g., nylon), thermo(setting) plastics, resins, transparent powders, colored powders, metal powder, ceramics powder such as for example glass particles, and/or a combination of at least two of these or other materials wherein such combination may include different particles each of different materials or different materials in a single compound particle. Examples of blended build materials include alumide, which may include a blend of aluminum and polyamide, and plastics or ceramics blends. There exist more build materials and blends of build materials that can be managed by an apparatus of this disclosure and that are not mentioned in this disclosure.

FIG. 1 shows an example method 100 of generating process capability data for a 3D printer based on a print job comprising a single 3D printing build. The method may be applied by a data processing apparatus which may be in the 3D printer itself or may be external from the 3D printer and communicatively coupled to it. In some examples the data processing apparatus may be in a computer device.

At block 110, the data processing apparatus receives a print job comprising first process, or control, values of a set of variable process, or control, parameters and second process values of the set of variable process parameters. The first process values are associated with a first object, or item, to be printed and the second process values are associated with a second object, or item, to be printed. The data comprises a three-dimensional model of the objects and a location within a build region, or build zone, where the objects are to be printed. For process capability analysis, a user may arrange for the first and second objects to be the same, and share a common three-dimensional model, to enable the determination of which set of input process values lead to the most pleasing results for that particular form of object.

The model for a print job may comprise a Computer-Aided Design (CAD) model, where a shape of the object(s) is defined in a three-dimensional space. For example, the model may define the object(s) as a series of geometric shapes having particular co-ordinates in three dimensions. Alternatively, the model may comprise a rasterized representation, wherein the three-dimensional object(s) is defined based on a series of voxel values within the three-dimensional space, wherein a voxel represents a unit volume of the space. In yet another case, the model may define the object(s) as a series of surfaces within the three-dimensional space, each surface having an area and a normal vector. Other models and representations are also possible.

Process values of a set of variable process parameters for each of the first and second objects are also determined, wherein each process parameter relates to a parameter of a controllable component of the 3D printer such as a fuse lamp or a nozzle arranged to deposit agent. Variable process, or control, parameters may include, but are not limited to: a power output of fuse lamps, a white temperature set point of pre-heating lamps, a global pulse width modulation (PWM) set point of pre-heating lamps, a local PWM lamp scale factor of pre-heating lamps, a maximum level of detailing agent inside a part, a maximum level of detailing agent outside a part, RR mask boundary padding, the maximum level of fusing agent inside a part, an airflow input amount, a balance of airflow over bed, and an inlet heater temperature. Other examples are possible.

At block 110, a set of variable process parameters is determined for the objects that are to be printed. In one example, the determined set of variable process parameters is the set of all possible variable process parameters for the respective 3D printer. That is, all process parameters that can be varied. In another example, the determined set of variable process parameters is a subset of the set of all possible variable process parameters, where a variation of other parameters that are not in the subset may be determined to have little or no impact on the kind of objects that are to be printed. In any event, the set of variable process parameters may be determined by the user of the 3D printer and supplied to the 3D printer via a user interface of the printer itself or via a computer device, for example. Alternatively, the determined set of parameters may be restricted by the manufacturer of the 3D printer. This may be the case when the variation of certain parameters for some processes may unintentionally damage the 3D printer and/or may be inappropriate for the kind of build material being used.

Once a set of variable process parameters for the print job has been determined, first and second process values of the set of variable process parameters are determined for the first and second objects. In one example, at least one process value of the first process values is different from a respective process value of the second process values. In this way, the user of the 3D printer can study the effect of varying the at least one process value on the printed objects. For example, any one or more of the process parameters listed above may be varied.

In another example, the first and second process values of the set of variable process parameters are the same for each object to be printed. This may be the case when the user wishes to perform a time series analysis on a particular printing process, whereby, for example, each object is printed at a different time, for instance at a different height level, or z-axis, within an available build volume of a respective 3D printer. In this case, it will be appreciated that the time of printing, in terms of the height in the build volume, acts as or becomes a variable process parameter. Such a time series analysis may be performed to determine the magnitude and direction of drift in print performance or quality over time, given fixed process parameters.

In any case, once the particular process parameter values are determined, they may be assigned, respectively, to the printing of each object. This may be done by the data processing apparatus itself. Alternatively, the process values may be assigned to, or associated with, a CAD model of each object to be printed.

The distribution of the first and second build regions within the build volume may be done automatically by the data processing apparatus. Alternatively, the positioning of the first and second build regions may be determined manually by the user. The user may provide a set of co-ordinates for each of the objects within the available build volume which may determine the location of each build region. The determination may depend on which set of variable process parameters are to be studied. In one example, each of the objects may be arranged to be printed within a particular horizontal strip or layer of the build volume such that the second object is to be vertically stacked on top of the first object. In this way, each horizontal strip or layer may be considered as an experiment level for an experiment or experimental build. If the first object is identical to the second object, each point in the first object will have the same x, y location within the build volume as a corresponding point in the second object.

In some cases, it may be beneficial to precede the printing of each object by a configurable number of blank layers wherein no objects are printed. The number of blank layers acts as a non-printing level which may allow for the thermal stabilization of the process to the modified process parameter settings in between the printing of the first and second objects. For instance, one or more of the variable process parameters may be temperature dependent. Printing the second object immediately after completion of the printing of the first object, without a non-printing level, may not allow the process values of the process parameters to accurately coincide with the process values that are determined at block 110. Separating the objects by a non-printing layer allows the process parameter values to settle to the predetermined values and further provides thermal insulation between the printing of the first and second objects. The number of blank layers that make up the non-printing level may be user configurable and may be chosen based on the particular process at hand. Alternatively, the data processing apparatus may provide a default value for the number of non-printing layers to apply after the completion of the printing of each object. Such a default value may be determined by the manufacturer of the 3D printer or may be determined by the user during setup. The non-printing level may range from a single layer of build material to enough layers of build material such that the first and second experiment levels are sufficiently separated within the build volume that a first experiment does not impact a second experiment.

In another example of the distribution of objects within the available build volume, one or more of the possible experiment levels may be subdivided into a plurality of regions wherein each of the regions are defined to be printed with different process values of the set of variable process parameters. In this case, two identical objects will have corresponding points that have the same z co-ordinate within the build volume. Such a configuration may be useful for the contained study of the effects of varying agent amounts and their combinations at any given z-axis coordinate. This also provides a way to incorporate more than one object per experiment level allowing the user to pack more objects into the available build volume. As above, each printing region within a single experiment level may be non-contiguously spaced apart by a non-printing region wherein no agent is deposited. This may allow for the thermal stabilization of the process parameters within a single build layer, the amount of stabilization dependent on the distance between the first and second objects.

In another example, the printer may allow for full position configurability of each object of the multiple objects within the build volume. Such a configuration may be useful when it is desirable to maximally separate the first and second objects or where the shape of the objects allows for a non-trivial solution to the corresponding packing problem.

At block 120, the data processing apparatus causes the 3D printer to print a first item in a first build region of a build volume using the first process values and print a second item in a second build region of the build volume using the second process values, the first build region being spaced apart from the second build region within the build volume.

Determination of the first and second process values of the set of variable process parameters is described in connection with block 110 above. As has been described, the variable process parameters may comprise at least one of a power output of fuse lamps, a white temperature set point of pre-heating lamps, a global pulse width modulation (PWM) set point of pre-heating lamps, a local PWM lamp scale factor of pre-heating lamps, a maximum level of detailing agent inside a part, a maximum level of detailing agent outside a part, RR mask boundary padding, the maximum level of fusing agent inside a part, an airflow input amount, a balance of airflow over bed, and an inlet heater temperature.

In some cases, the printing may begin with a warm up profile prior to printing the first object. In this case, the 3D printer may deposit a number of build layers without applying agent. These blank layers define a warm up profile which allows for the stabilization of the printing parameters prior to printing the first object such that the process values of the set of variable process parameters are substantially equal to the first process values as determined at block 110. As build material is deposited during the warm up profile, each of the controllable components of the 3D printer are caused to reach their intended first process values. Once it is established that the controllable components are operating at the desired first process values, the 3D printer begins to print (at least) the first object.

As described above, the 3D printer may be arranged to print the first object in a first experiment level. In this case, on completion of the printing of the first object, the 3D printer may deposit a non-print level as described above. While the 3D printer deposits build material comprising the non-printing level, the controllable components are adjusted so that the second process values for the printing of the second object are obtained. In another example, the first and second objects may be printed within the same experiment level, and so each layer of each of the objects will be printed at the same time in terms of layer deposition. In this case, the first and second build regions, wherein the first and second objects are respectively printed, may be arranged to be non-contiguously spaced apart by a non-printing region to provide thermal stabilization of the process parameters in between the deposition of agents and to provide thermal insulation between the build regions.

In any case, on completion of the printing of the print job, the 3D printer may perform at least one end-of build procedure to facilitate accurate measurements. An example of an end-of-build procedure is an annealing process wherein fuse lamps continue to heat the build volume after the printing of the print job has completed. This may enhance crystallization and/or reputation within the build volume. Another example of an end-of-build procedure is a cooling process wherein the temperature of the fuse lamps is controllably reduced. Consequently, the temperature of the top layers may be reduced slowly. Abruptly removing power to the fuse lamp may cause these final build layers to cool too quickly, compared to lower layers, affecting the measurable physical properties of the uppermost object in the print job.

At block 130, the data processing apparatus receives measurements of print parameters comprising first print parameters resulting from printing the first object and second print parameters resulting from printing the second object. The 3D printer comprises at least one means for detecting physical properties within the 3D printer. Such means may be communicatively coupled to the data processing apparatus. The coupling may be a wired connection, for example if the data processing apparatus is in the 3D printer itself. Alternatively, the coupling may be wireless, for example if the data processing apparatus is external from the 3D printer, such as in a computer device.

Such means for detecting properties of the three-dimensional build may include temperature sensors, optical sensors, pressure sensors, position sensing modules and other means for obtaining diagnostic data about the 3D printer itself and the respective set of controllable components found therein. Observable properties of the three-dimensional build might include indirectly measured print parameters such as the irradiance level over an object, object temperature after the application of a recoat, object temperature just before burying with powder, temperature gradient within an object, or the supply powder temperature. In addition to this, properties may comprise directly measured print parameters such as the air pressure inside the 3D printer and nozzle health.

The measured print parameters may be provided in real time to the data processing apparatus during the building of each object. During each successive layer of each object being printed, the sensors of the 3D printer measure physical characteristics of the object and communicate these to the data processing apparatus. This measurement data may be stored by the data processing apparatus for future use.

Alternatively, the measured print parameters may be provided to the data processing apparatus on completion of the printing of each object. Whether the measurements are taken during printing or after printing depends on the nature of the measurement. For example, the temperature gradient of an object may be continuously measured during a build to determine if the gradient exceeds a maximum or minimum threshold at any point throughout printing. In another example, the exterior color of the object may be measured. The color intensity or gamut may be affected by several processes within the 3D printer. As such, an accurate measurement of the final surface color may be available after completion of the build.

At block 140, the data processing apparatus is arranged to generate a dataset comprising data representing the first process values associated with the first print parameters and data representing the second process values associated with the second print parameters. The generated dataset may be in the form of a particular output file type. In one example, the output file may be sent to an external computer device communicatively coupled to the 3D printer. The computer device may be arranged to read the dataset. The generated dataset may be at least one of: manipulated or processed, made available to view by a user interface of the 3D printer or an external computer device, and output via a 2D printer.

In any case, the generated dataset may allow for an analysis of the relationship between the set of input process parameters and the output print parameters resulting from the printing of each object. For example, a process with N input process parameters and M output measurable print parameters defines a mapping between an N dimensional input parameter space and an M dimensional output parameter space. Each set of process parameter values may define a single point in the input parameter space, and each point may be written as an N-tuple. This point may then be mapped by the printing of the object with this particular set of process values to a set of measurable print parameter values, which define a single point in the output parameter space and may be written as an M-tuple. The mapping may be many-to-one in the sense that several points in the input parameter space may be mapped to a single point in the output parameter space.

For example, consider a simple case wherein there are two variable process parameters for a process, and a single measurable print parameter. These process parameters may relate to the fuse lamp power and the amount of fusing agent applied to each layer of the print job, while the measurable print parameter may be the air pressure within the printing area. Each point in the input parameter space may be represented by the two-tuple (fuse lamp power, amount of fusing agent) and each point in the output parameter space may be represented by the one-tuple (air pressure).

In reality, over the course of printing numerous objects using the same process parameter values, each point in the input parameter space will map to a set of possible points defining a closed region in the output parameter space due to variable conditions inside the printer, and manufacturing and sensing tolerances of the hardware of the printer. The boundary of this closed region defines the tolerance of the process, and the center of the region defines the median of the set of measurable print parameter values. Within this first closed region, one may define a second closed region with a boundary that lies entirely within the boundary of the first closed region. This second region may enclose all points with values that are a certain number of standard deviations from the mean. For example, the region defined to contain all points within $3\sigma$ from the mean will contain 99.7% of all points.

When determining desired process values of a set of variable process parameters, a single point may be defined in the output parameter space that represents the ideal measurable print parameter values of the object obtained via the particular printing process. A closed region around this single point may be determined which represents the set of all measurable print parameter values that are deemed acceptable for the particular process. Every point outside the closed region will correspond to measurable print parameter values that are deemed not acceptable.

The dataset generated at block 140 may allow for a determination of third process values of the set of variable process parameters for a second, subsequent, print job that uses the same printing process. The second print job may correspond to a larger, production run of the object, or alternatively, may be a further process capability experiment. In either case, the determination of the third process values may be done manually by a user. For example, a user may inspect the generated dataset to determine the third process values for the subsequent print job. Alternatively, the determination of the third process parameters may be done automatically, for example, by the data processing apparatus itself or by an external computer device.

In one example, wherein at least one process value of the first process values is different from a respective process value of the second process values, one of the first and second objects will have print parameters considered most pleasing. The process values corresponding to the most pleasing object may be used in a second print job to generate at least one additional object. In another example, wherein the first and second process values are equal, it may be determined from the generated dataset that the process values for the set of variable process parameters is either: acceptable for a subsequent printing of an object, or not acceptable for a subsequent printing of an object. For example, if it is determined that there is acceptable print parameter drift for a particular set of process values, the determined third process values may be equal to the first (and second) process values for a subsequent print job. However, if it is determined that there is an unacceptable amount of print parameter drift for a particular set of process values, the determined third process values may differ from the first (and second) process values.

In any case, the method described herein may provide a quick way of adapting a 3D printer to a special production run. That is, the production of three-dimensional objects via a printing process that differs from previous printing processes. The method described herein may also be extended to print any number of objects that can fit within the available build volume. This further reduces the number of three-dimensional print builds needed to determine a favorable set of process values for a single printing process.

Figure 2:
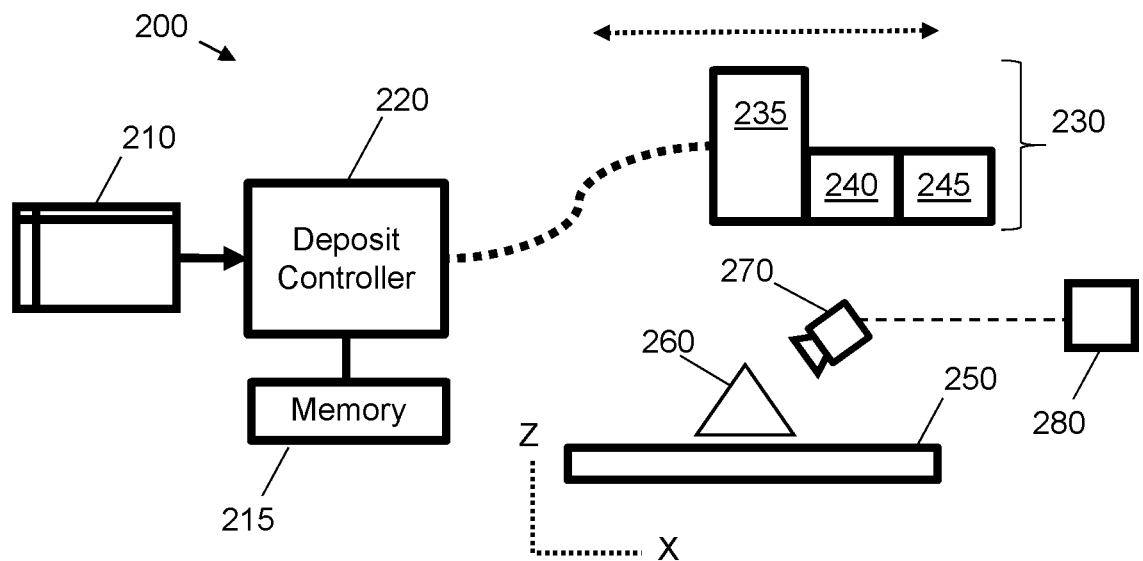
FIG. 2 is a is a schematic diagram showing 3D printing apparatus according to an example.

FIG. 2 shows an example of a 3D printing apparatus 200 arranged to receive a print job comprising first control values of a set of variable control parameters and second control values of the set of variable control parameters. The first control values are associated with a first object to be printed and the second control values are associated with a second object to be printed. The apparatus 200 comprises a deposit controller 220 and a memory 225. The deposit controller 220 may comprise one or more processors that form part an embedded computing device, e.g. for use in controlling a 3D printer. Memory 225 may comprise volatile and/or non-volatile memory, e.g. a non-transitory storage medium, arranged to store computer program code. The deposit controller 220 is communicatively coupled to controllable components of the 3D printer that are arranged to construct the three-dimensional build. These comprise a deposit mechanism 230. The deposit mechanism 230 is arranged to deposit the materials available for production of the three-dimensional build according to generated control data. In the present case, the deposit mechanism comprises a substrate supply mechanism 235 and an agent ejection mechanism 240, 245. In other cases, the deposit mechanism 230 may comprise fewer or additional components, e.g. a substrate supply mechanism may be provided separately from the agent ejection mechanism or omitted, or other components, e.g. the deposit mechanism 230 may comprise a polymer extraction mechanism. In the schematic example of FIG. 2, the agent ejection mechanism 240, 245 comprises two components: a first component 240 for the supply of a first agent and a second component 245 for the supply of a second agent. Two materials are presented in this example for ease of explanation, but any number of materials may be supplied. Similar materials in the form of agents are described for example. The substrate supply mechanism 235 is arranged to supply at least one substrate layer upon which the materials available for production are deposited by the agent ejection mechanism 240, 245 to produce the three-dimensional build 260. In the present case, the materials comprise fluid print agents that are applied to a powder substrate, wherein the combination of agent and powder, following application of energy, forms part of the object being generated. However, other implementations are possible, e.g. the materials may be deposited to form part of the object, e.g. as per the polymer case discussed above. In the example of FIG. 2, the three-dimensional build 260 is built layer by layer on a build platform or platen 250. The arrangement of the aspects and components shown in FIG. 2 are not limiting; the exact arrangement of each apparatus will vary according to the production technology that is implemented and the model of apparatus.

In the example of FIG. 2, the deposit controller is arranged to print a first object in a first build zone of a build volume using the first control values and print a second object in a second build zone of the build volume using the second control values, the first build zone being spaced apart from the second build zone in the build volume. The deposit controller 220 is arranged to process and/or otherwise use the data 210 to control one or more components of the deposit mechanism 230. The deposit controller 220 may control one or more of the substrate supply mechanism 235 and the agent ejection mechanism 240, 245. For example, the discrete deposit instructions in the control data 250 may be used by the deposit controller 220 to control nozzles within the agent ejection mechanism. In one implementation the apparatus 200 may be arranged to use a coalescing agent and a coalescing modifier agent that are respectively supplied by the components of the agent ejection mechanism 240, 245. These agents allow each printed three-dimensional object to have varying material properties. They form part of the "materials" of the material volume coverage vector. They may be combined with one or more colored powdered substrate materials, e.g. applied using an inkjet mechanism to deposited powder layers, to generate multi-color objects with varying material properties. If a plurality of powdered substrate materials are available, they may also form part of the "materials" of the material volume coverage vector in certain cases. In these cases, the generated objects may be constructed by depositing at least the coalescing agent and the coalescing modifier agent on layers of substrate material, e.g. layers of powder or other material forming z-plane slices, followed by the application of energy to bind the material, e.g. infra-red or ultra-violet light. For example, one or more of the substrate supply mechanism 235 and the agent ejection mechanism 240, 245 may be moveable relative to the platen 250, e.g. in one or more of the x, y and z axes (wherein the y axis is into the sheet for FIG. 2). One or more of the substrate supply mechanism 235, the agent ejection mechanism 240, 245 and the platen 250 may be moveable under control of the deposit controller 220 to achieve this. Additionally, one or more inks may also be deposited on cured and/or uncured layers, wherein these inks also form part of the "materials" of the material volume coverage vector. In other implementations the apparatus may comprise part of, amongst others, selective laser sintering systems, stereo lithography systems, inkjet systems, fused deposition modelling systems, any three-dimensional printing system, inkjet deposition systems and laminated object manufacturing systems. These include apparatus that directly deposit materials rather than those described that use various agents.

In one case, the functionality of the production controller 230 and the deposit controller 220 may be combined in one embedded system that is arranged to receive each object definition 240, or data useable to produce the object definition 240, and control the apparatus 200. This may be the case for a "stand alone" apparatus that is arranged to receive data 210, e.g. by physical transfer and/or over a network and produce an object accordingly. For example, this apparatus may be communicatively coupled to a computer device that is arranged to send the three-dimensional print job comprising the first and second control values associated with the first and second objects 230, or data useable to produce the first and second objects 230, to the apparatus in the manner of a 2D printer.

In the example of FIG. 2, the 3D printing apparatus comprises at least one component 270 for measuring physical properties of the build. The at least one component 270 may comprise at least one sensor arranged measure print parameters comprising first print parameters resulting from printing the first object and second print parameters resulting from printing the second object. The measurements may be taken during the printing of each layer and/or on completion of the printing of each object within the build volume. Such measurements comprise print parameters providing information about each printed layer which may relate to the quality of the final printed object. The print parameters may represent directly and indirectly observable measurements which may be dependent on the set of control parameter values used for the printing of each object. In one example, the at least one component 270 may be a thermal imaging camera arranged to measure the temperature across each printed layer of each of the objects. The measured print parameter in this case is the temperature of each measurable point of each printing layer of each object.

The measured print parameters may then be transmitted to a data processing apparatus 280 of the 3D printing apparatus. Once the measured print parameters are received by the processor 280, a dataset may be generated comprising data representing the first control values associated with the first print parameters and data representing the second control values associated with the second print parameters. The generated dataset may allow for a determination of a more favorable set of control parameter values in a similar manner to the previously described examples.

Figure 3:
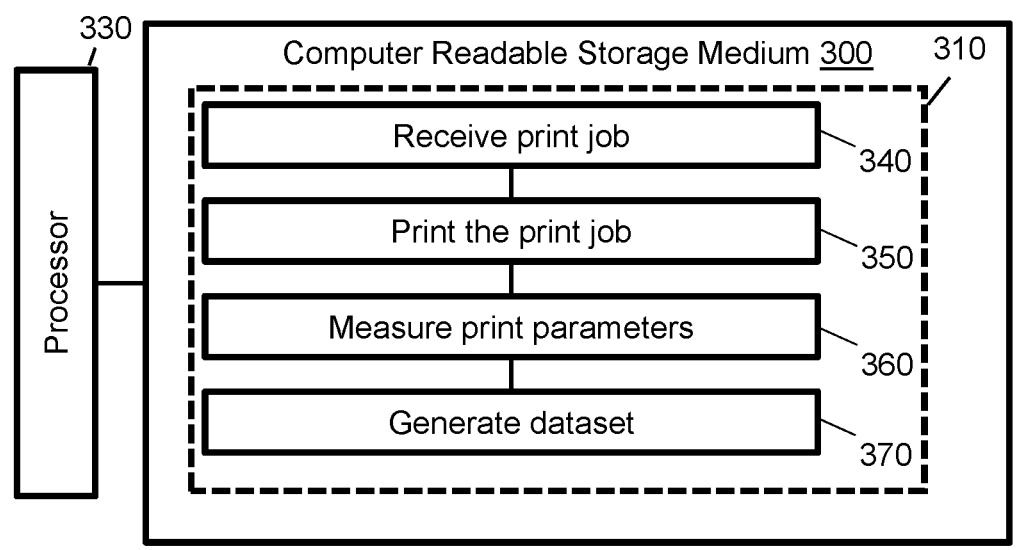
FIG. 3 is a schematic diagram showing a non-transitory computer-readable storage medium comprising a set of computer-readable instructions that, when executed by a processor, cause the processor to perform an example method.

FIG. 3 shows a computer device 300 comprising a non-transitory computer-readable storage medium 310 comprising a set of computer-readable instructions 320 that, when executed by a processor 330, cause the processor 330 to generate a dataset in a similar manner to the previously described examples. The computer-readable storage medium 310 may comprise any machine-readable storage media, e.g. such as a memory and/or a storage device. Machine-readable storage media can comprise any one of many physical media such as, for example, electronic, magnetic, optical, electromagnetic, or semiconductor media. More specific examples of suitable machine-readable media include, but are not limited to, a hard drive, a random-access memory (RAM), a read-only memory (ROM), an erasable programmable read-only memory, or a portable disc. In one case, the processor 330 may be arranged to store instructions 320 in memory such as RAM to implement the complex event processing engine.

The instructions 320 are arranged to cause, via instruction 340, the processor to receive a print job comprising first process values of a set of variable process parameters and second process values of the set of variable process parameters. For example, this may comprise data representing a model of each item as described above and the process values associated with each object to be printed.

Via instruction 350 the processor is caused to provide an instruction to a 3D printer to print a first item in a first build region of a build volume using the first process values and print a second item in a second build region of the build volume using the second process values, the first build region being spaced apart from the second build region in the build volume. The print data instructs deposition of a functional agent for a given layer, such as a binding or fusing agent as described above. The print control data indicates which addressable areas are to become portions of the three-dimensional item to be printed, e.g. how voxels representing the item in a digital domain are to be mapped to physical portions of build material, wherein build material in a given layer is selectively solidified in accordance with the deposit of the functional agent, e.g. it may be fused following application of an energy source.

Via instruction 360 the processor receives measured print parameters comprising first print parameters resulting from printing the first item and second print parameters resulting from printing the second item. The measurements are provided by one or more sensors of the 3D printer and may provide measurements as each layer of the print job is deposited or may provide measurements on completion of the printing of each item.

Instruction 370 causes the processor to generate a dataset comprising data representing the first process values associated with the first print parameters and data representing the second process values associated with the second print parameters. This data may allow for a determination of an appropriate set of process values to use in the subsequent printing of the items, as has been described in previous examples above.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A non-transitory computer-readable storage medium storing instructions executable by a processor to:
    receive a print job comprising first process values of a set of variable process parameters and second process values of the set of variable process parameters;
    print, as part of the print job, a first instance of an object defined by a three-dimensional model, the first instance printed in a first build region of a build volume and by using the first process values, a first;
    print, as part of the print job, a second instance of the object defined by the three-dimensional model, the second instance printed in a second build region of the build volume and by using the second process values, the first build region being spaced apart from the second build region in the build volume;
    measure print parameters comprising first print parameters resulting from printing the first instance and second print parameters resulting from printing the second instance; and
    generate a dataset comprising data representing the first process values associated with the first print parameters and data representing the second process values associated with the second print parameters.

2. The non-transitory computer readable storage medium of claim 1, wherein the first build region is non-contiguously spaced apart from the second build region by a non-printing region.

3. The non-transitory computer readable storage medium of claim 1, wherein at least one process value of the first process values is different from a respective process value of the second process values.

4. The non-transitory computer readable storage medium of claim 1, wherein the first and second process values of the set of variable process parameters are all equal.

5. The non-transitory computer readable storage medium of claim 1, wherein the second build region is stacked on top of the first build region.

6. The non-transitory computer readable storage medium of claim 1, wherein the first build region is positioned within a same horizontal plane of the build volume as the second build region.

7. The non-transitory computer readable storage medium of claim 1, wherein the print job is a first print job, and wherein the instructions are executable by the processor to further:
    receive a second print job comprising third process values of the set of variable process parameters, wherein the third process values are based on the generated dataset; and
    print, as part of the second print job, a third instance of the object defined by the three-dimensional model, using the third process values.

8. A three-dimensional (3D) printing apparatus arranged to:
    receive a print job comprising first control values of a set of variable control parameters and second control values of the set of variable control parameters;
    print, as part of the print job, a first instance of an object defined by a 3D model, the first instance printed in a first build zone of a build volume and by using the first control values;
    print, as part of the print job, a second instance of the object defined by the 3D model, the second instance printed in a second build zone of the build volume and by using the second control values, the first build zone being spaced apart from the second build zone in the build volume;
    measure print parameters comprising first print parameters resulting from printing the first instance of the object and second print parameters resulting from printing the second instance of the object; and
    generate a dataset comprising data representing the first control values associated with the first print parameters and data representing the second control values associated with the second print parameters.

9. The 3D printing apparatus of claim 8, wherein the first build zone is non-contiguously spaced apart from the second build zone by a non-printing zone.

10. The 3D printing apparatus of claim 8, wherein at least one control value of the first control values is different from a respective control value of the second control values.

11. The 3D printing apparatus of claim 8, wherein the first and second control values of the set of variable control parameters are all equal.

12. The 3D printing apparatus of claim 8, wherein the second build zone is stacked on top of the first build zone.

13. The 3D printing apparatus of claim 8, wherein the first build zone is positioned within a same horizontal plane of the build volume as the second build zone.

14. The 3D printing apparatus of claim 8, wherein the print job is a first print job, and wherein the 3D printing apparatus is further arranged to:
    receive a second print job comprising third control values of the set of variable control parameters, wherein the third control values are determined based on the generated dataset; and
    print, as part of the second print job, a third instance of the object defined by the 3D model, using the third control values.

* * * * *